(12) United States Patent
Kohno

(10) Patent No.: US 7,099,394 B2
(45) Date of Patent: Aug. 29, 2006

(54) IMAGE PROCESSING METHOD AND APPARATUS, PROGRAM, AND STORAGE MEDIUM

(75) Inventor: Akihiro Kohno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 10/376,489

(22) Filed: Feb. 28, 2003

(65) Prior Publication Data

US 2003/0161535 A1 Aug. 28, 2003

(30) Foreign Application Priority Data

Feb. 28, 2002 (JP) ............................. 2002-054656

(51) Int. Cl.
*H04N 7/18* (2006.01)

(52) U.S. Cl. ............................. 375/240.25; 375/240.27

(58) Field of Classification Search ............... 375/240.011–240.29; 348/143–160; 382/224, 382/159; 707/1–3
See application file for complete search history.

(56) References Cited

U.S. PATENT DOCUMENTS

| | | | | |
|---|---|---|---|---|
| 5,764,786 A * | 6/1998 | Kuwashima et al. | ........ | 382/107 |
| 5,850,352 A * | 12/1998 | Moezzi et al. | ........... | 345/419 |
| 6,297,846 B1 * | 10/2001 | Edanami | .................... | 348/239 |
| 6,404,455 B1 * | 6/2002 | Ito et al. | ..................... | 348/169 |
| 6,404,925 B1 * | 6/2002 | Foote et al. | ................ | 382/224 |

FOREIGN PATENT DOCUMENTS

| | | |
|---|---|---|
| JP | 2000-235637 | 8/2000 |
| JP | 2000-235638 | 8/2000 |

* cited by examiner

*Primary Examiner*—Andy Rao
(74) *Attorney, Agent, or Firm*—Morgan & Finnegan LLP

(57) ABSTRACT

It is an object of this invention to easily search many photographed images for a desired image. In order to achieve this object, an image processing apparatus for processing a plurality of photographed images and image information having attributes attached to the plurality of images includes a similarity determination device which determines similarities between a query image and the plurality of images, an attribute comparing device which compares an attribute of the query image and attributes of the plurality of images, and a weighting device which weights a similarity determination result obtained by the similarity determination device on the basis of the comparison result obtained by the attribute comparing device.

14 Claims, 8 Drawing Sheets

FIG. 6

| IMAGE DATA NAME | Speed | EXPOSURE | DATE/HOUR | SIMILARITY |
|---|---|---|---|---|
| data042 | 1" | 11 | 2001/12/27 09:10 | 100 |
| data001 | 1/60 | 11 | 2001/12/25 12:00 | 95.6 |
| data156 | 1/30 | 22 | 2001/12/26 23:22 | 92.0 |
| photo23 | 1/250 | 5.6 | 2001/12/26 18:56 | 42.3 |
| ... | | | | |

601

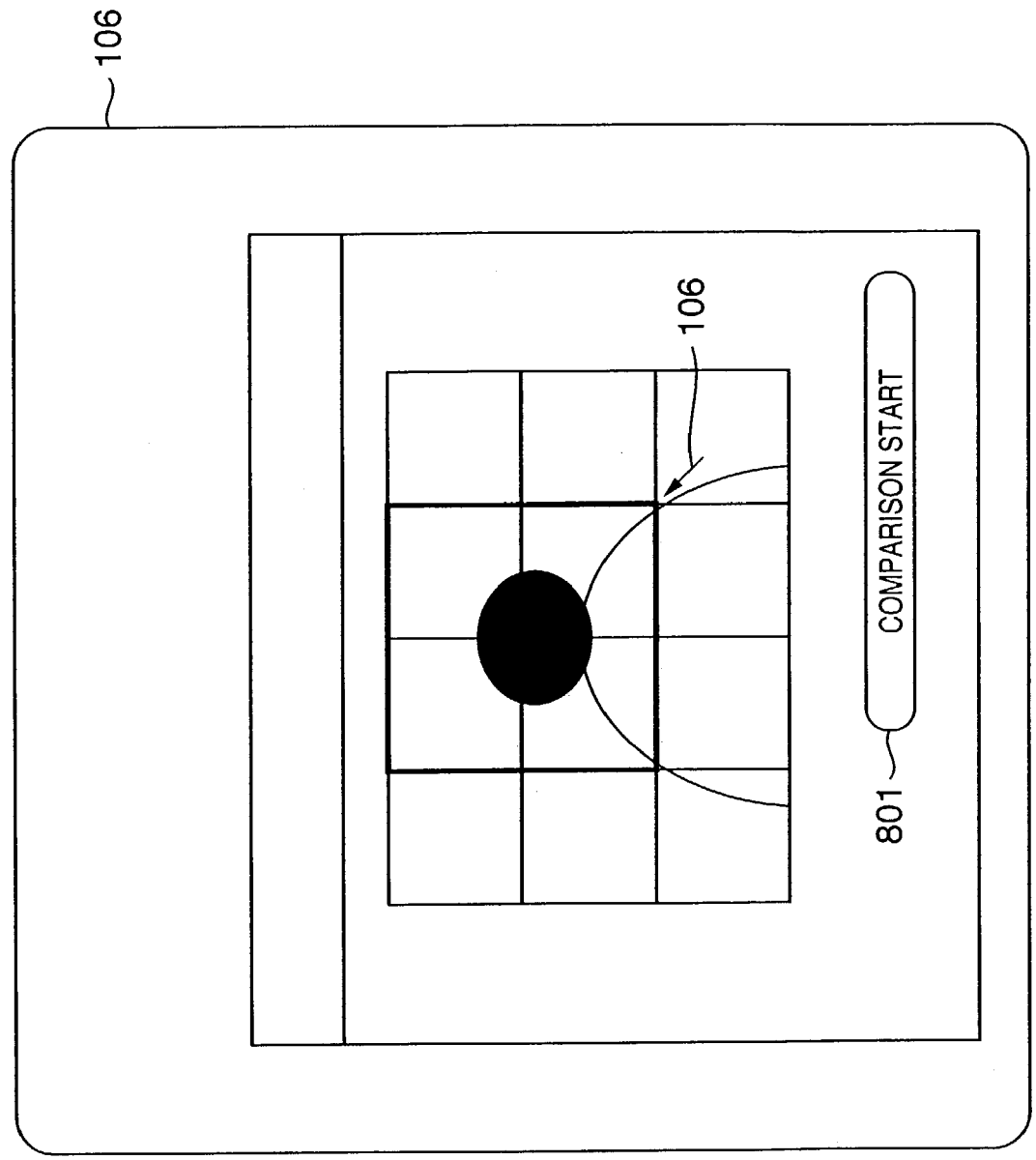

IMAGE PROCESSING METHOD AND APPARATUS, PROGRAM, AND STORAGE MEDIUM

FIELD OF THE INVENTION

The present invention relates to a technique of determining similarities between a plurality of images.

BACKGROUND OF THE INVENTION

Recently, devices designed to handle images as digital data, e.g., digital cameras and digital video recorders, have become popular.

A pan head camera is also used, which is designed to control moving images from a remote place or automatically control them, as represented by WebView.

Along with these tendencies, some of the conventionally used cameras which record dates, hours, shutter speeds, and exposure information, and can be controlled are designed to attach, to images, not only information such as a pan angle, tilt angle, and field angle as attributes, but also various control information and supplementary information (e.g., temperature and weather) for images as attributes.

In addition, surveillance systems using such cameras are used, and photographed images are stored and used.

In general, however, an enormous number of images are photographed by a surveillance system, and a search is made on the basis of the date/hour of photography. However, a found image is not always the one requested by a user.

As disclosed in Japanese Patent Laid-Open Nos. 2000-235637 and 2000-235638, in some cases, image searches are made on the basis of similarities themselves among image data.

By using similarities between images, for example, images similar to a query image can be found or a scene change in a TV program can be detected by obtaining a change point.

However, images obtained by searches using similarities between image data do not always coincide with images wanted by users.

This is because, it is difficult to obtain a similarity in consideration of all conditions at the time of photography by using only an algorithm for obtaining a similarity itself between images.

In addition, when image data are accumulated for surveillance, the number of search targets becomes huge, and it is important to narrow down to necessary target images.

Furthermore, in photography by a moving camera, different images are sensed depending on control. Even if, therefore, different objects are photographed, similar images may be photographed when the objects are similar in color or shape.

SUMMARY OF THE INVENTION

The present invention has therefore been made in consideration of the above problems, and has as its object to facilitate searching many sensed images for a desired image.

In order to solve the above problems and achieve the above object, according to the first aspect of the present invention, there is provided an image processing apparatus for processing a plurality of photographed images and image information having attributes attached to the plurality of images, characterized by comprising a similarity determination device which determines similarities between a query image and the plurality of images, an attribute comparing device which compares an attribute of the query image and attributes of the plurality of images, and a weighting device which weights a similarity determination result obtained by the similarity determination device on the basis of a comparison result obtained by the attribute comparing device.

According to the second aspect of the present invention, there is provided an image processing method of processing a plurality of photographed images and image information having attributes attached to the plurality of images, characterized by comprising the similarity determination step of determining similarities between a query image and the plurality of images, the attribute comparing step of comparing an attribute of the query image and attributes of the plurality of images, and the weighting step of weighting a similarity determination result obtained in the similarity determination step on the basis of a comparison result obtained in the attribute comparing step.

According to the third aspect of the present invention, there is provided a program characterized by causing a computer to execute the above image processing method.

According to the fourth aspect of the present invention, there is provided a storage medium characterized by computer-readably storing the above program.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a view showing a similarity display example in the first embodiment;

FIG. 8 is a view showing an example of how a block is designated in the second embodiment.

DETAILED DESCRIPTION OF THE PREFERRED EMBODIMENTS

Preferred embodiments of the present invention will be described below with reference to the accompanying drawings.

(First Embodiment)

Figure 1:
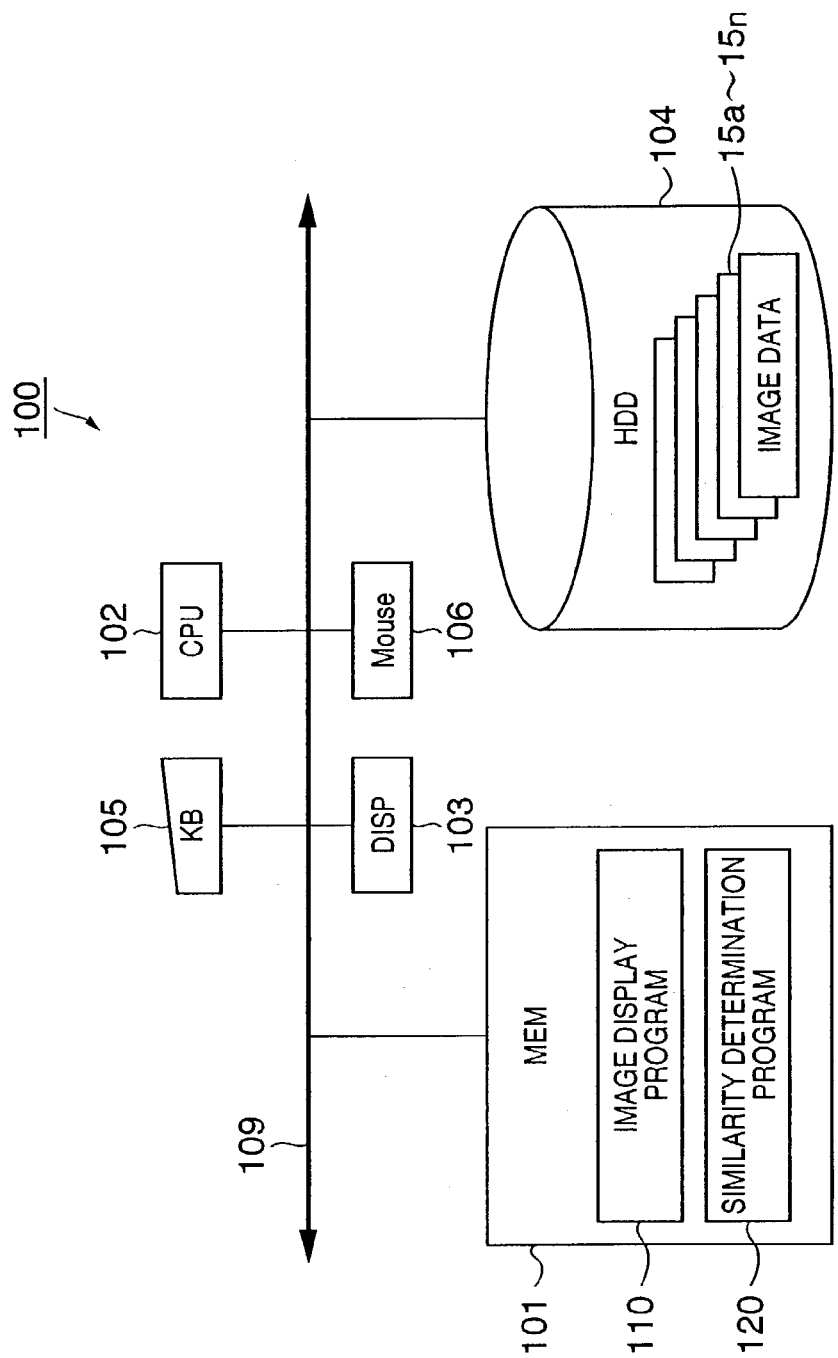
FIG. 1 is a view showing the arrangement of an image processing apparatus according to the first embodiment.

FIG. 1 is a view showing the system architecture of an image processing apparatus according to the first embodiment of the present invention.

Referring to FIG. 1, an image processing apparatus 100 includes a memory 101 which stores a program necessary to boot up the system and data, a central processing unit (CPU) 102 for controlling arithmetic operation and processing, a display unit 103 for displaying information such as characters, symbols, and images, an auxiliary storage device (HDD) 104 which stores data and information, a keyboard unit 105 for inputting characters and the like, a pointing device 106 for indicating a displayed character, image, or the like with a cursor, mouse, or the like, and the like. These components are connected through a bus 109.

An image display program 110 and similarity determination program 120 are stored in the memory 101. Image data $15_a$~$15_n$ are stored in the HDD 104.

The operation of the image processing apparatus of this embodiment will be described next.

Figure 2:
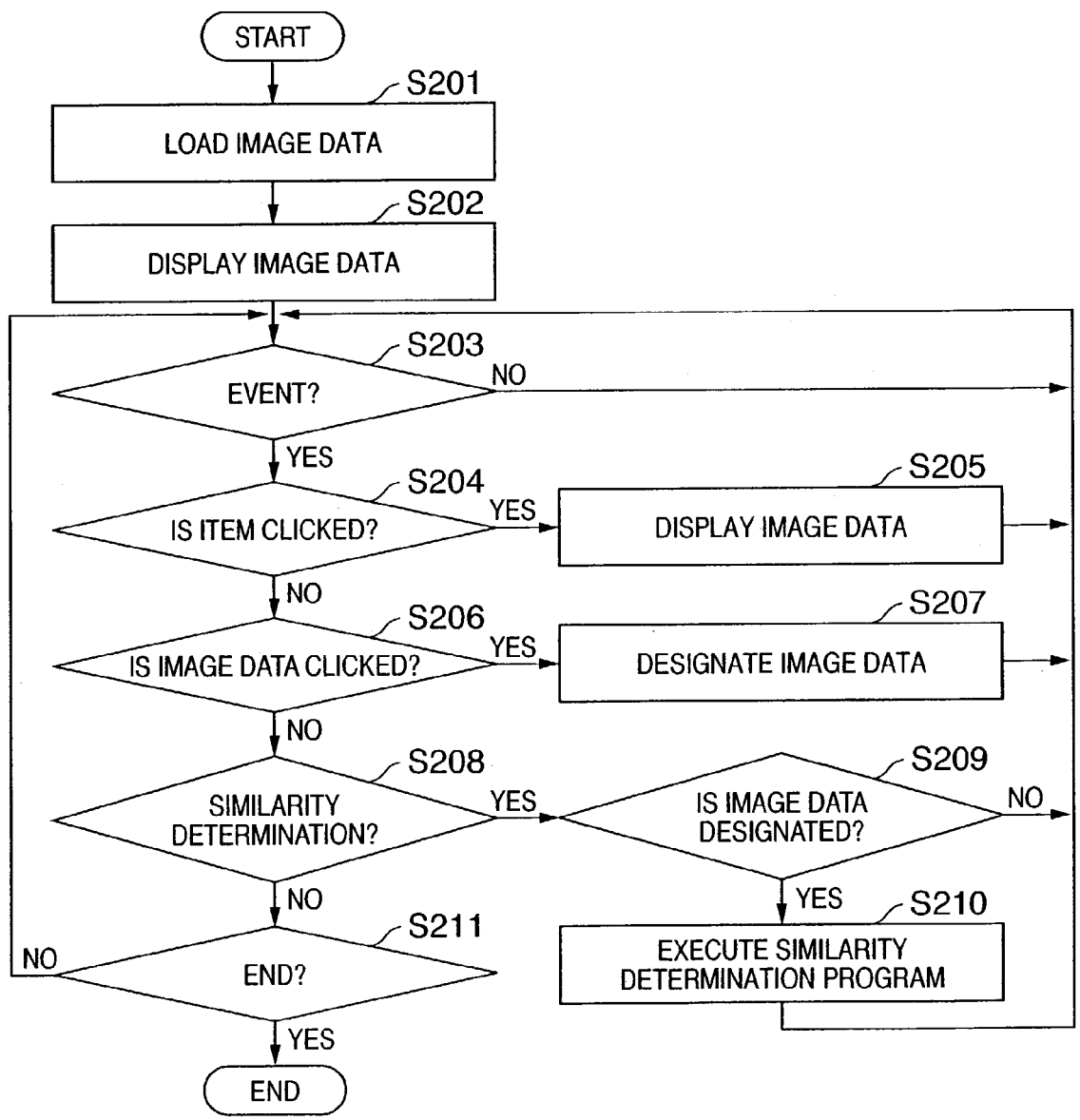
FIG. 2 is a flow chart for explaining the flow of an image display program according to the first embodiment.

FIG. 2 is a flow chart showing the image display operation of the image display program 110. In step S201, the image data $15_a$~$15_n$ are loaded from the HDD 104. For example, the image data are conventional jpeg image data or Exif data, and the header portion of each data contains the attribute values of the image. Assume that the attribute values include a sensing date and hour, exposure, shutter speed, pan angle, tilt angle, and field angle.

Figure 3:
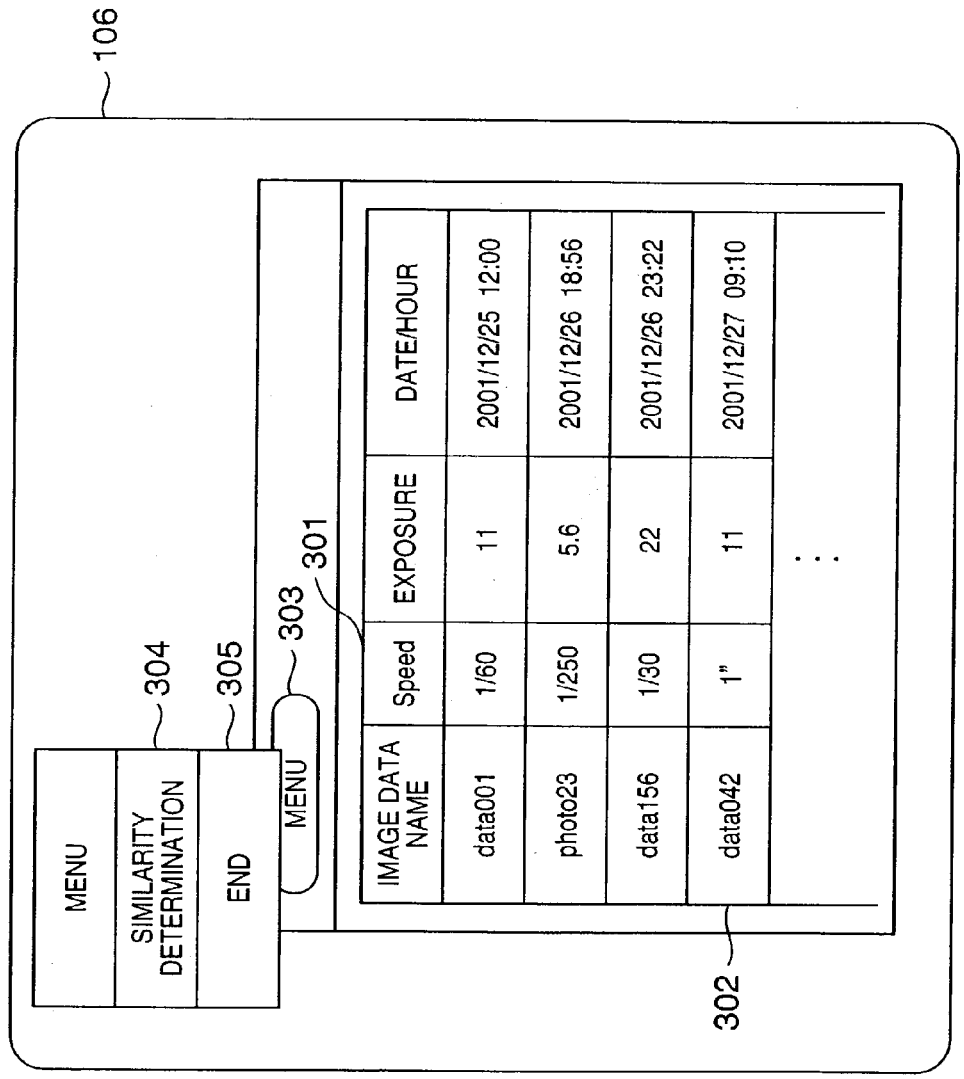
FIG. 3 is a view showing an image display example in the first embodiment.

In step S202, as shown in FIG. 3, image data are sorted, for example, in the order of sensing dates and hours, and the corresponding image data names are displayed on the display unit 103. Note that images themselves may be displayed instead of or in addition to the image data names.

In step S203, the flow waits for an event.

If an event is input, the flow advances to step S204. If, for example, this event is an event of clicking (selecting) an attribute item 301 in FIG. 3 such as shutter speed in the window with the mouse (not shown), image data are sorted according to the values in the shutter speed item and displayed again (step S205).

If it is determined in step S206 that the event in step S203 is an event of clicking (selecting) an image data name 302 in FIG. 3 with the mouse (not shown), the corresponding image is designated (step S207).

In step S208, if, for example, a tab 303 in FIG. 3 is clicked to display a menu and a similarity determination tab 304 displayed on the menu is selected, the flow advances to step S209. In step S209, after it is checked whether an image is designated, the similarity determination program 120 is executed to determine similarities between the image designated in step S210 and all the remaining images (database image group).

If, for example, end 305 on the menu is selected in step S211, the image display program is terminated.

Figure 4:
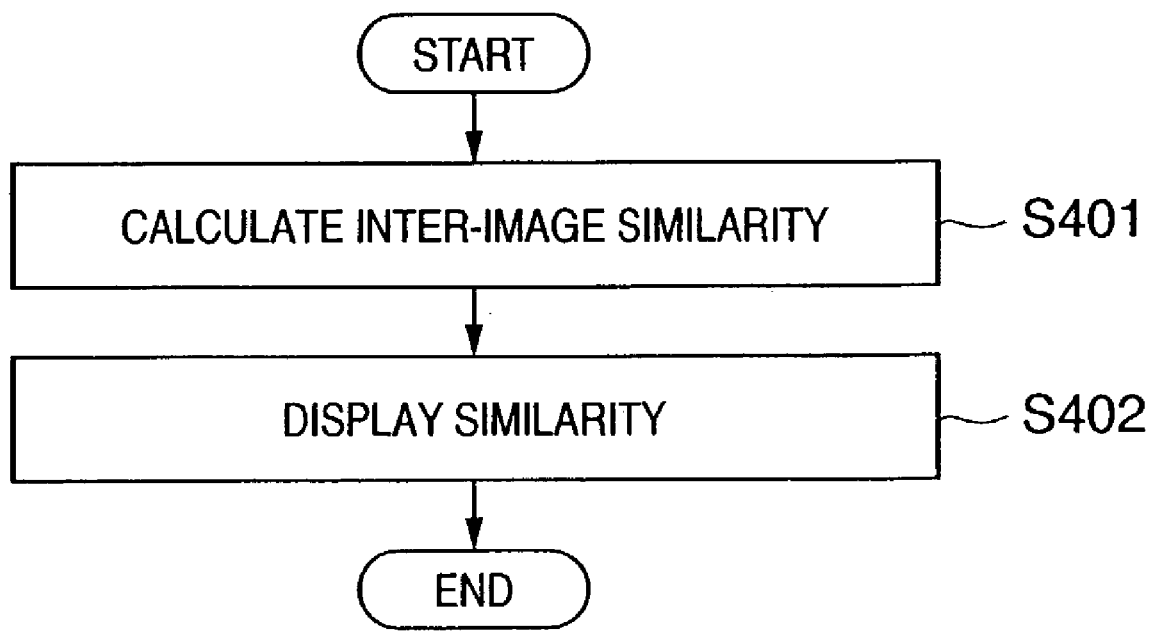
FIG. 4 is a flow chart for explaining the flow of a similarity determination program according to the first embodiment.

FIG. 4 shows an example of the operation of the similarity determination program 120.

In step S401, an inter-image similarity calculation between the image designated in step S207 and all the remaining images (database image group) is performed.

In this inter-image similarity calculation, a known inter-image-data similarity distance calculation like that disclosed as the inter-frame similarity calculation in Japanese Patent Laid-Open Nos. 2000-235637 and 2000-235638 is performed. This calculation algorithm is not limited to any specific algorithm. The following is a simplest example.

Figure 5:
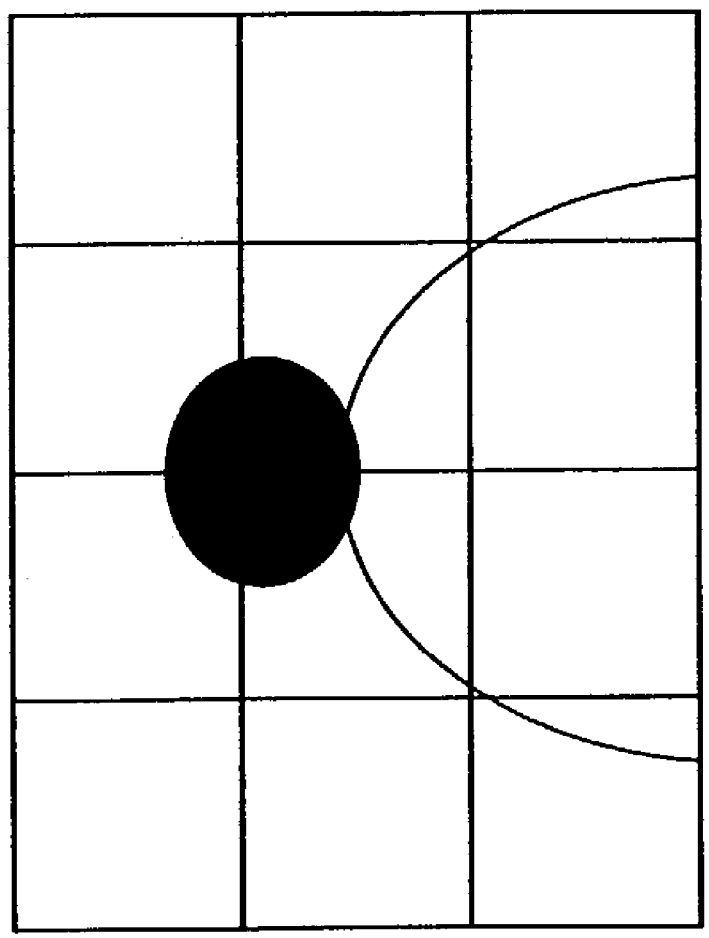
FIG. 5 is a view showing an example of how an image is divided into blocks in the vertical and horizontal directions in an inter-image similarity calculation according to the first embodiment.

Each of the query image and database images is divided into a plurality of blocks in the vertical and horizontal directions, as shown in FIG. 5, and average R (red), G (green), and B (blue) values in each block are calculated in advance. The sum of squares of differences in R, G, and B channels between each block of the query image and a corresponding block of each database image are calculated as an inter-image similarity distance representing the degree of similarity. The smaller this value, the lower the degree of similarity, and vice versa. In brief, such values indicate whether the images are similar in color layout.

The following is an example of the mathematical expression of this operation:

$$\sum_{i=1}^{k} \{(P_{1iR} - P_{2iR})^2 + (P_{1iG} - P_{2iG})^2 + (P_{1iB} - P_{2iB})^2\} \quad (1)$$

where
 i: a block number in processing
 k: the number of blocks divided
 $P_{1iR}$: the average value of the R channel in the ith block of the query image
 $P_{1iG}$: the average value of the G channel in the ith block of the query image
 $P_{1iB}$: the average value of the B channel in the ith block of the query image
 $P_{2iR}$: the average value of the R channel in the ith block of the database image
 $P_{2iG}$: the average value of the G channel in the ith block of the database image
 $P_{2iB}$: the average value of the B channel in the ith block of the database image Let D be similarity (or distance) information indicating the degree of similarity on the basis of this inter-image similarity calculation result. If, for example, R, G, and B values each range from 0 to 255, the information D is distributed between 0 and $255^2 \times 3 \times k$ (195075k).

A similarity S of a database image is normalized to fall within the range of 0 to 100 as follows:

$$S = (195075k - D)/195075k \times 100 \quad (2)$$

In this case, the larger the similarity S of the query image within 100, the more the two images resemble each other.

The similarity S is stored on the basis of this inter-image similarity calculation result. This processing is performed for each database image to obtain similarities between the query image and all the database images.

When the calculation of similarities between the query image and all the database images is complete, the flow advances to step S402 to display the similarity calculation result on a similarity list 601 like that shown in FIG. 6.

In the similarity list 601, data are sorted and displayed in similarity order (decreasing order).

After all the similarities are calculated and displayed, the similarity determination program 120 is terminated. Note that mathematical expression (1) is only an example, and the present invention is not limited to this.

The similarity calculation processing in step S401 which is a characteristic feature of this embodiment will be described next. Assume that in this embodiment, an image to be processed is an image which is obtained from a camera whose sensing direction and zooming magnification can be controlled and has a pan angle, tilt angle, and zooming magnification as attribute information. Assume that a query image has a pan angle Px, tilt angle Tx, and field angle Zx as attributes, and a database image has a pan angle Py, tilt angle Ty, and field angle Zy as attributes. In this case, when the two images differ in PTZ (Pan, Tilt, Zoom) values, the weight of the similarity S between them is decreased. If, for example, the PTZ values of the two images coincide with each other, the similarity S calculated by equation (2) is used without any change. If the two images differ in one of the PTZ values, S/2 which is ½ the similarity S is used as a similarity S', thus performing a weighting calculation.

Such a similarity calculation is effective in checking similarities between images photographed at predetermined intervals by a camera whose sensing direction is automatically turned to predetermined directions. This is because, in automatic control of such a camera, its sensing direction is set to a plurality of directions, and the camera is sequentially turned to these sensing directions. For this reason, similarity determination can be done more accurately by taking the pan, tilt, and zoom characteristics of the camera into consideration rather than by simply comparing images on the basis of only inter-image similarity calculation results.

The weighting calculation may be modified as follows. A given coefficient A of 0 or 1 is used. When the PTZ values of two images coincide with or similar to each other, flag ptz=0 is set; otherwise, for example, in case the difference between the PTZ values is larger than a predetermined value, ptz=1. A similarity S″ is calculated with a weight being changed by using ptz in the following manner:

$$S''=S-(S \times A \times ptz) \quad (3)$$

As another modification, a case will be described below, in which as attribute information of an image, attribute information indicating whether the image is photographed by a camera while its sensing direction was moving is added.

An image photographed by the camera while its sensing direction is moving may cause an image blur. For this reason, even if a high similarity is calculated by an inter-image similarity calculation, a person does not actually recognize in many cases that the similarity is high. In this embodiment, in consideration of such inconvenience, for example, an "in-motion" attribute flag F value is set to 1 during the movement of the camera, and the attribute flag F value is set to 0 while the camera remains at rest. For example, a given coefficient B (0<B<100), e.g., 50, is used, and a further improvement in precision is attained by calculating a similarity S‴ with a weight indicating whether the information is high in reliability being changed by using the "in-motion" flag in the following manner:

$$S'''=S-B \times F \quad (4)$$

Note that reliability in terms of image blurring may be taken into consideration in a weighting calculation by using, for example, a flag indicating whether the camera successfully focused by the autofocus function instead of the "in-motion" attribute flag.

As described above, a similarity that reflects the conditions at the time of sensing operation and matches human sensitivities cannot always be calculated by a conventional inter-image similarity calculation alone. As in this embodiment described above, however, an accurate similarity can be calculated by using the attributes of images. With such an arrangement of this embodiment, when an enormous amount of image data are stored for surveillance, images to undergo comparison can be narrowed down to a fewer images.

When the PTZ values variously change in photographing operation of a camera during automatic control, different images are sensed. For this reason, by applying PTZ attributes to a similarity, similarity between images that are likely to be taken from the same object to be sensed can be increased, thereby improving the accuracy of the similarity. In addition, a similarity with higher accuracy can be obtained by adding an "in-motion" attribute flag unique to the camera to an image.

(Second Embodiment)

In this embodiment, the accuracy of similarity is improved by executing a procedure for always making a user designate a target rectangle whenever he/she designates an image. Since the system architecture of this embodiment is the same as that of the first embodiment except that the similarity determination program 120 in FIG. 1 is modified into a similarity determination program 121, a description thereof will be omitted.

The operation of this embodiment will be described below.

Figure 7:
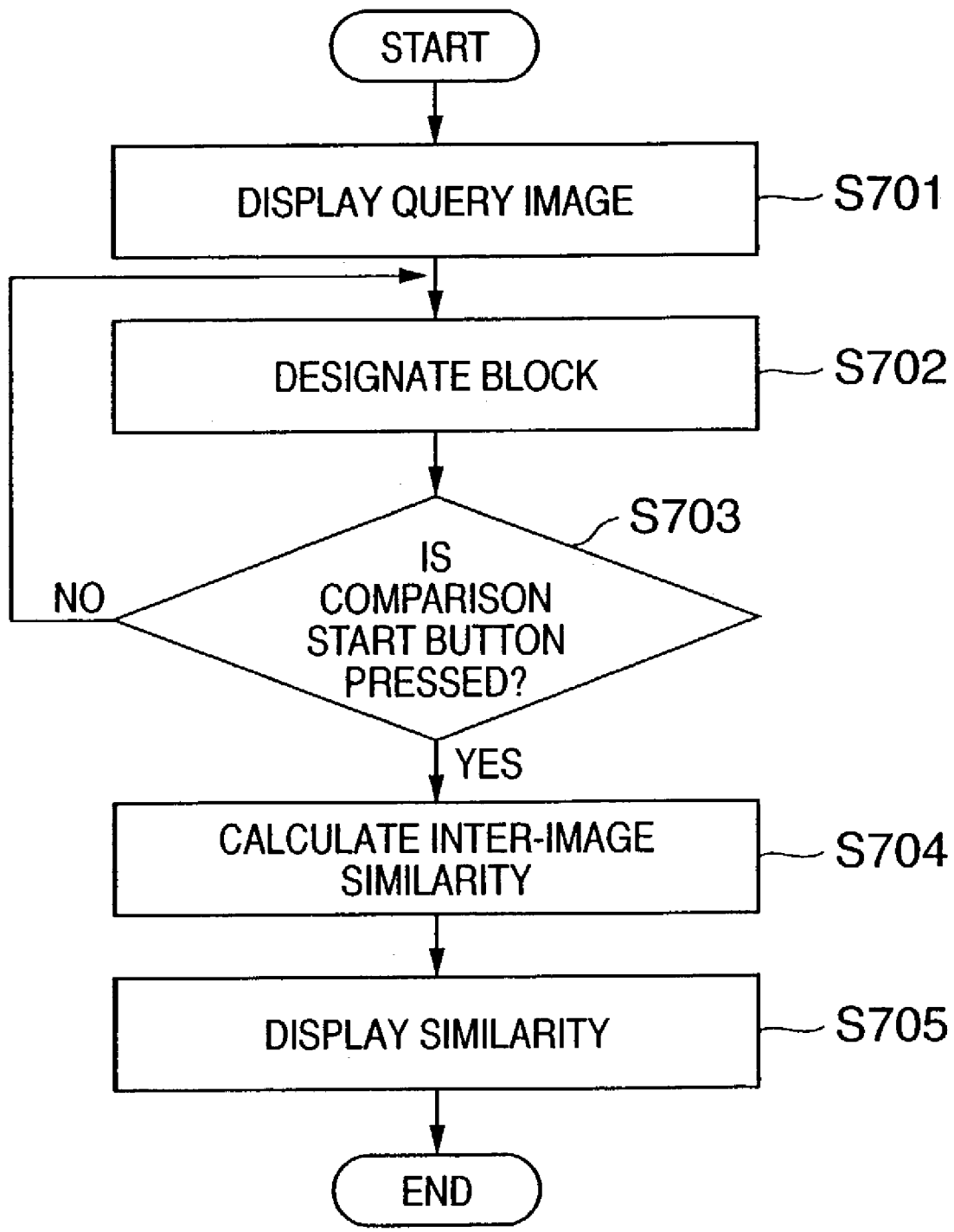
FIG. 7 is a flow chart for explaining the flow of a similarity determination program according to the second embodiment.

FIG. 7 is a flow chart showing the operation of the similarity determination program 121.

In step S701, a query image on which a rectangular frame for making the user designate an image range used for an inter-image similarity calculation is superimposed is displayed (FIG. 8). This rectangular frame can be moved by the designation by the user. Note that until an image range is designated, a comparison start button 801 is set in the disable state by being grayed out.

When the comparison start button 801 is clicked (selected) in step S703, inter-image similarity calculations between the image designated by the user and all the remaining images (database image group) are performed (step S704). This operation differs from the operation of the frame buffer 210 in step S401 in the first embodiment in that i in mathematic expression (1) is applied to only the image range designated in step S702.

In step S705, the similarity calculation results are displayed in the same manner as in FIG. 6. After all similarities are calculated and displayed, the similarity determination program 121 is terminated.

By always making the user designate a target block in step S702, the influences of unnecessary portions on a similarity calculation can be eliminated, and similarity determination can be done with higher accuracy. Note that in step S704, similarities may be weighted by using PTZ attributes and a camera "in-motion" attribute.

[Other Embodiment]

It is obvious that the objects of the respective embodiments are realized even by supplying a storage medium (or a recoding medium) storing software program codes for realizing the functions of the above embodiments to a system or apparatus, and causing the computer (or a CPU or an MPU) of the system or apparatus to read out and execute the program codes stored in the storage medium. In this case, the program codes read out from the storage medium realize the functions of the above embodiments by themselves, and the storage medium storing the program codes constitutes the present invention. In addition, the functions of the above embodiments are realized not only when the readout program codes are executed by the computer but also when the operating system (OS) running on the computer performs part or all of actual processing on the basis of the instructions of the program codes.

The functions of the above embodiments are also realized when the program codes read out from the storage medium are written in the memory of a function extension board inserted into the computer or a function extension unit connected to the computer, and the CPU of the function extension board or function extension unit performs part or all of actual processing on the basis of the instructions of the program codes.

When the present invention is to be applied to the above storage medium, program codes corresponding to the procedures described above are stored in the storage medium.

As has been described above, according to the above embodiments, the following effects can be obtained.

(1) Similarity determination can be done with higher accuracy.

(2) When an enormous number of images are to be narrowed down, in particular, similarity determination can be done with higher accuracy.

(3) With regard to image data obtained by a controllable moving camera, in particular, similarity determination can be done with higher accuracy by using the attribute values of the data.

(4) By using a pan angle, tilt angle, and field angle as attribute values, in particular, similarity determination can be done with higher accuracy.

(5) Similarity determination can be done with higher accuracy by always making the user designate part of a target image.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for processing a plurality of photographed images, comprising:
    a similarity determination device which determines similarities between a query image and the plurality of images;
    an attribute comparing device which compares an attribute of a camera which has photographed the query image and an attribute of a camera which has photographed the plurality of images; and
    a weighting device which weighs a similarity determination result obtained by said similarity determination device on the basis of a comparison result obtained by said attribute comparing device.

2. The apparatus according to claim 1, wherein the attribute includes information indicating a moving state of the camera which has sensed the plurality of images.

3. The apparatus according to claim 1, wherein the attribute includes information about a sensing direction of the camera which has photographed the plurality of images.

4. The apparatus according to claim 3, wherein the information about the sensing direction includes information about panning, tilting, and zooming of the camera.

5. The apparatus according to claim 1, wherein the attribute includes information indicating that reliability of the image is low.

6. The apparatus according to claim 1, further comprising a designation device which designates a range in one image in which a similarity is to be determined when similarities between the predetermined image and the plurality of images are determined.

7. An image processing method of processing a plurality of photographed images, comprising:
    the similarity determination step of determining similarities between a query image and the plurality of images;
    the attribute comparing step of comparing an attribute of a camera which has photographed the query image and an attribute of a cameras which has photographed the plurality of images; and
    the weighting step of weighting a similarity determination result obtained in the similarity determination step on the basis of a comparison result obtained in the attribute comparing step.

8. The method according to claim 7, wherein the attribute includes information indicating a moving state of the camera which has sensed the plurality of images.

9. The method according to claim 7, wherein the attribute includes information about a sensing direction of the camera which has photographed the plurality of images.

10. The method according to claim 9, wherein the information about the sensing direction includes information about panning, tilting, and zooming of the camera.

11. The method according to claim 7, wherein the attribute includes information indicating that reliability of the image is low.

12. The method according to claim 7, farther comprising the designation step of designating a range in one image in which a similarity is to be determined when similarities between the predetermined image and the plurality of images are determined.

13. A program causing a computer to execute an image processing method of claim 7.

14. A storage medium computer-readably storing a program of claim 13.

* * * * *